United States Patent
Doshi et al.

(10) Patent No.: US 9,360,907 B2
(45) Date of Patent: *Jun. 7, 2016

(54) SYSTEM AND METHOD FOR ADAPTIVE THERMAL MANAGEMENT IN A PORTABLE COMPUTING DEVICE

(71) Applicant: QUALCOMM INCORPORATED, San Diego, CA (US)

(72) Inventors: Paras S. Doshi, San Diego, CA (US); Ankur Jain, San Diego, CA (US); Unnikrishnan Vadakkanmaruveedu, Phoenix, AZ (US); Vinay Mitter, San Diego, CA (US); Anil Vootukuru, San Diego, CA (US); Ronald F. Alton, Oceanside, CA (US); Jon J. Anderson, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,667

(22) Filed: Jan. 20, 2015

(65) Prior Publication Data
US 2015/0169016 A1    Jun. 18, 2015

Related U.S. Application Data

(63) Continuation of application No. 13/537,315, filed on Jun. 29, 2012, now Pat. No. 8,972,759.

(51) Int. Cl.
*G06F 1/26* (2006.01)
*G06F 1/32* (2006.01)
(Continued)

(52) U.S. Cl.
CPC .............. *G06F 1/206* (2013.01); *G06F 1/3203* (2013.01); *G06F 1/324* (2013.01); *G06F 1/3296* (2013.01);

(Continued)

(58) Field of Classification Search
CPC ..... G06F 1/3203; G06F 1/3287; G06F 1/206; G06F 11/3058; Y02B 60/1217
See application file for complete search history.

(56) References Cited

U.S. PATENT DOCUMENTS 5,940,785 A * 8/1999 Georgiou ................ G06F 1/206
                                                            702/132
6,535,798 B1   3/2003 Bhatia et al.
(Continued)

FOREIGN PATENT DOCUMENTS

CN      101351759 A    1/2009
KR    20090077952 A    7/2009
(Continued)

OTHER PUBLICATIONS

International Search Report and Written Opinion—PCT/US2013/040787—ISA/EPO—Jan. 31, 2014.

*Primary Examiner* — Mohammed Rehman
*Assistant Examiner* — Gayathri Sampath
(74) *Attorney, Agent, or Firm* — Nicholas A. Cole

(57) ABSTRACT

Various embodiments of methods and systems for adaptive thermal management techniques implemented in a portable computing device ("PCD") are disclosed. Notably, in many PCDs, temperature thresholds associated with various components in the PCD such as, but not limited to, die junction temperatures, package on package ("PoP") memory temperatures and the "touch temperature" of the external surfaces of the device itself limits the extent to which the performance capabilities of the PCD can be exploited. It is an advantage of the various embodiments of methods and systems for adaptive thermal management that, when a temperature threshold is violated, the performance of the PCD is sacrificed only as much and for as long as necessary to clear the violation before authorizing the thermally aggressive processing component(s) to return to a maximum operating power.

30 Claims, 11 Drawing Sheets

(51) Int. Cl.
*G06F 1/20* (2006.01)
*G06F 11/30* (2006.01)

(52) U.S. Cl.
CPC ........ *G06F 11/3031* (2013.01); *G06F 11/3058* (2013.01); *G06F 1/3287* (2013.01); *G06F 11/3037* (2013.01); *Y02B 60/1217* (2013.01); *Y02B 60/1285* (2013.01)

(56) References Cited

U.S. PATENT DOCUMENTS

| | | | |
|---|---|---|---|
| 7,062,933 B2 | 6/2006 | Burns et al. | |
| 7,231,531 B2 | 6/2007 | Cupps et al. | |
| 7,460,932 B2 | 12/2008 | Johns et al. | |
| 8,972,759 B2 | 3/2015 | Doshi et al. | |
| 2003/0110423 A1* | 6/2003 | Helms | G06F 1/206 714/100 |
| 2004/0088593 A1 | 5/2004 | Park | |
| 2004/0148528 A1 | 7/2004 | Silvester | |
| 2004/0215988 A1* | 10/2004 | Clabes | G06F 1/206 713/300 |
| 2006/0161375 A1 | 7/2006 | Duberstein et al. | |
| 2007/0121492 A1* | 5/2007 | Johns | G01K 3/005 370/223 |
| 2007/0156370 A1 | 7/2007 | White et al. | |
| 2007/0260893 A1 | 11/2007 | Aguilar, Jr. et al. | |
| 2008/0036613 A1 | 2/2008 | Gaskins et al. | |
| 2011/0145605 A1 | 6/2011 | Sur et al. | |
| 2012/0075992 A1 | 3/2012 | Shahidi et al. | |
| 2012/0096288 A1* | 4/2012 | Bates | G06F 1/206 713/320 |

FOREIGN PATENT DOCUMENTS

| | | |
|---|---|---|
| KR | 20090119745 A | 11/2009 |
| KR | 20120063340 A | 6/2012 |

* cited by examiner

MAXIMUM PERFORMANCE STATE — 505

- TEMPERATURES MAY EXCEED INITIAL TEMPERATURE THRESHOLD, BUT DO NOT EXCEED JUNCTION, PoP OR SKIN TEMPERATURE THRESHOLDS
- PROCESSOR RUNNING AT FULL POWER LEVEL AND FREQUENCY
- SAMPLING AT LOW SAMPLING RATE IF TEMPERATURE(S) EXCEED INITIAL THRESHOLD
- PROCESSOR IS IN THIS STATE DURING ADAPTIVE THERMAL MANAGEMENT RESET PERIOD
- HIGHEST QoS AND USER EXPERIENCE AS DEFINED BY PERFORMANCE

RAMP DOWN STATE — 510

- TEMPERATURES MAY EXCEED ANY, SOME OR ALL JUNCTION, PoP AND SKIN TEMPERATURE THRESHOLDS
- PROCESSOR POWER LEVEL AND FREQUENCY REDUCED IN INCREMENTS UNTIL THRESHOLD(S) CLEARED
- SAMPLING AT EITHER LOW SAMPLING RATE OR HIGH SAMPLING RATE DEPENDING ON EXCEEDED THRESHOLD
- AFTER THRESHOLD(S) ARE CLEARED, PROCESSOR REMAINS IN THIS STATE AT LAST POWER AND FREQUENCY LEVEL FOR CUMULATIVE PENALTY PERIOD
- REDUCED QoS AND USER EXPERIENCE AS DEFINED BY PERFORMANCE

CORE OFF STATE — 515

- JUNCTION TEMPERATURE MAY EXCEED CRITICAL TEMPERATURE THRESHOLD
- PROCESSOR POWER LEVEL AND FREQUENCY COLLAPSED TO AVOID THERMAL DEGRADATION
- AFTER CRITICAL THRESHOLD IS CLEARED, PROCESSOR MAY BE REBOOTED

*FIG. 6*

SYSTEM AND METHOD FOR ADAPTIVE THERMAL MANAGEMENT IN A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there usually isn't enough space within a PCD for engineers and designers to mitigate thermal degradation or failure of processing components by using clever spatial arrangements or strategic placement of passive cooling components. Therefore, current systems and methods rely on various temperature sensors embedded on the PCD chip to monitor the dissipation of thermal energy and then use the measurements to trigger application of thermal management techniques that adjust workload allocations, processing speeds, etc. to reduce thermal energy generation.

For example, current systems and methods throttle a processor's voltage and frequency to predefined "levels" of performance. Based on an observed temperature reading, the processor may be ramped down to a level that was predetermined to mitigate thermal energy generation when the processor is under a heavy workload. Notably, for lighter workloads that are less demanding on processing resources, throttling a processor's voltage and frequency down to a level that was predetermined to mitigate thermal energy generation under a heavy workload may unnecessarily impact the quality of service ("QoS") provided to a user. Therefore, what is needed in the art is a system and method for adaptive thermal management in a PCD. More specifically, what is needed in the art is a system and method that, instead of making predetermined static mitigation decisions that assume a worst use case scenario, determines thermal mitigation decisions at run time based on temperature readings and current frequency/voltage levels of individual processing components.

SUMMARY OF THE DISCLOSURE

Various embodiments of methods and systems for adaptive thermal management techniques implemented in a portable computing device ("PCD") are disclosed. Notably, in many PCDs, temperature thresholds associated with various components in the PCD such as, but not limited to, die junction temperatures, package on package ("PoP") memory temperatures and the "touch temperature" of the external surfaces of the device itself limits the extent to which the performance capabilities of the PCD can be exploited. Generally, as more power is consumed by the various components of a PCD, the resulting generation of thermal energy can cause the temperature thresholds to be exceeded, thereby necessitating that the performance of the PCD be sacrificed in an effort to reduce thermal energy generation.

It is an advantage of the various embodiments of methods and systems for adaptive thermal management that, when a temperature threshold is violated, the performance of the PCD is sacrificed only as much and for as long as necessary to clear the violation before authorizing the thermally aggressive processing component(s) to return to a maximum operating power. One such method for adaptive thermal management in a PCD includes at the outset defining a discrete number of performance levels for one or more processing components in the PCD. Each performance level is associated with a power frequency that may be supplied to the one or more processing components. Each processing component is defaulted to running at its highest performance level.

Next, temperature thresholds associated with one or more temperature sensitive or critical components in the PCD are defined. Notably, because for many components in a PCD the amount of thermal energy generated directly correlates with the power level at which the component is allowed to run, these temperature thresholds may be viewed as "target" operating temperatures to which an adaptive thermal management system may seek to drive the processing components in the PCD. In some embodiments of an adaptive thermal management system and method, the temperature thresholds are associated with one or more components including a junction component, PoP memory component or outer shell component.

In operation, temperature sensors that may be used to measure or infer temperatures associated with the temperature sensitive components are monitored. Notably, one or more of the temperature sensitive components may also be a thermally aggressive component—a non-limiting example of a temperature sensitive component that may also be a thermally aggressive component is a core in a central processing unit (the junction aspects of the core are temperature critical and the core, by virtue of processing a workload, consumes power and generates thermal energy).

In some embodiments, the temperature sensors are monitored for an interrupt signal that is triggered from the violation of an initial threshold that is less than any of the preset thermal thresholds associated with temperature sensitive components. Upon receiving the interrupt, embodiments of the system may begin sampling readings from the sensors at time based intervals defined by a relatively slow sampling rate. If a temperature reading is taken at an interval that indicates that one or more of the temperature thresholds has been violated, then embodiments may leverage dynamic voltage and frequency scaling ("DVFS") techniques to reduce the performance level of one or more thermally aggressive processing components from the default maximum operating level to one level beneath maximum. At the next interval, the temperature readings are polled again and, if the violation has not been cleared, the performance level of the thermally aggressive component(s) is reduced to the next highest level. In this way, adaptive thermal management embodiments ensure that the processing power of any given processing component is only reduced as much as is required to keep temperatures below the thresholds.

Notably, in some embodiments, violation of a threshold associated with a "mission critical" component, such as a junction component, may trigger polling the sensors at a faster rate to ensure that the chances of thermal runaway of the PCD is avoided. Additionally, in some embodiments, penalty periods may be imposed after reduction in power levels of thermally aggressive components successfully reduces thermal energy generation to a level that enables the threshold violation to be cleared. It is envisioned that penalty periods may be cumulative based on how often, or how quickly, the adaptive thermal management system requires thermally aggressive processing component(s) to enter, or reenter, a ramp down state in order to clear a temperature threshold violation.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 6 is a diagram illustrating exemplary conditions associated with the particular policy states illustrated in FIG. 5.

DETAILED DESCRIPTION

Figure 1:
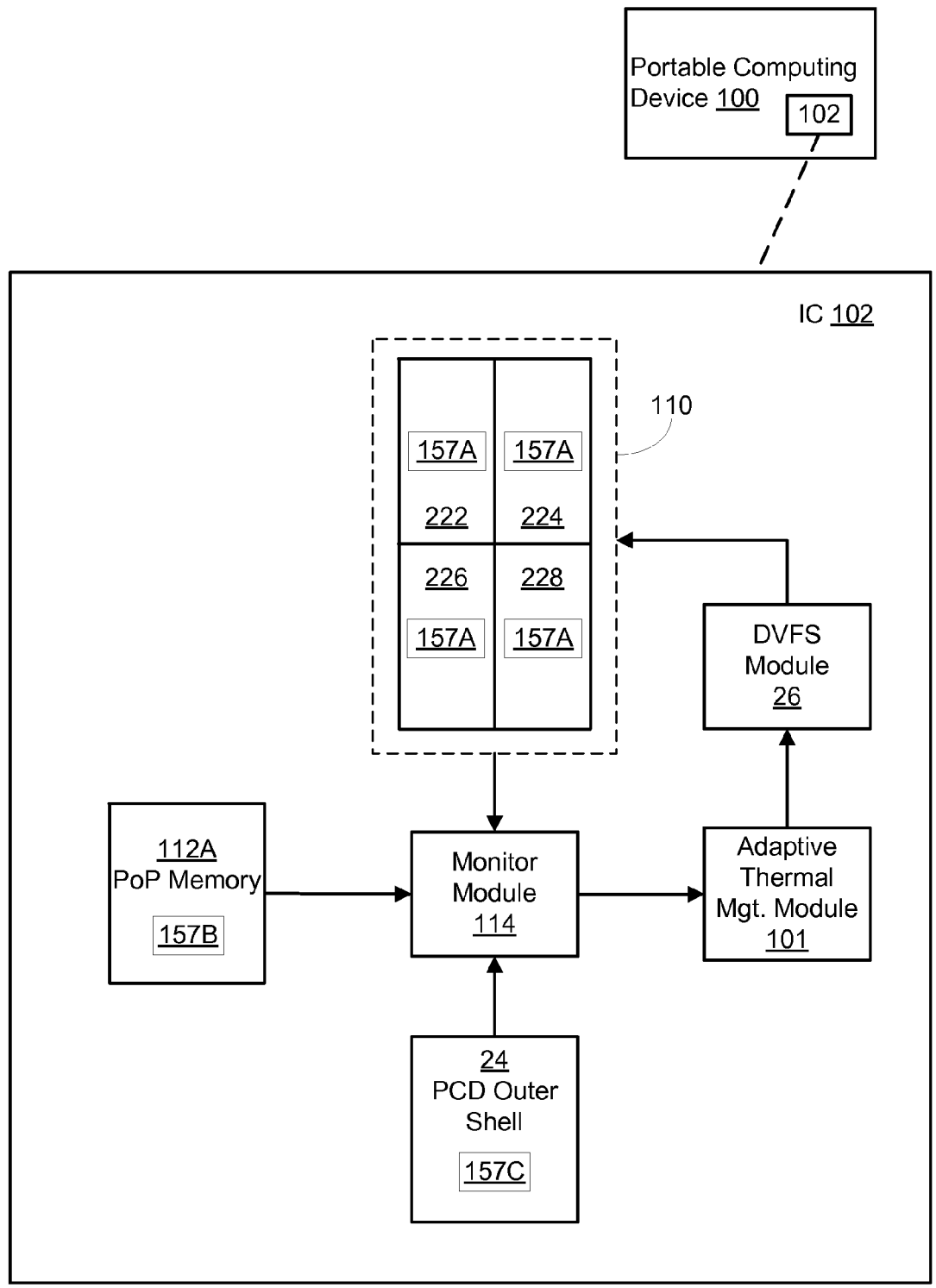
FIG. 1 is a functional block diagram illustrating an embodiment of an on-chip system for implementing adaptive thermal management methodologies in a portable computing device ("PCD")

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD. That is, although many of the embodiments are described in the context of a processing component, it is envisioned that adaptive thermal management policies may be applied to any functional component within a PCD including, but not limited to, a modem, a camera, a wireless network interface controller ("WNIC"), a display, a video encoder, a peripheral device, a battery, etc.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processor, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management," "thermal mitigation measure(s)," "throttling to a performance level" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing thermal energy generation in a PCD, without unnecessarily impacting quality of service ("QoS"), can be accomplished by leveraging one or more sensor measurements that correlate with the temperatures of silicon junctions in core(s), package on package ("PoP") memory components, and the outer shell, i.e. "skin," of the PCD. By closely monitoring the temperatures associated with those components, an adaptive thermal policy manager module in a PCD may systematically and individually reduce performance levels of thermally aggressive processing components one bin at a time in an effort to mitigate thermal energy generation and avoid critical temperature thresholds. Advantageously, by targeting certain temperature points at which it is acceptable to operate specific components, instead of reactively jumping to a reduced processing performance level predetermined to mitigate thermal energy generation in worst case scenarios, adaptive thermal management systems and methods can optimize QoS under any workload. Additionally, and as one of ordinary skill in the art will recognize, because adaptive thermal management methods can be applied without regard for the specific mechanics of thermal energy dissipation in a given PCD under a given workload, engineers and designers may leverage an adaptive thermal management approach without consideration of a PCD's particular form factor.

Notably, although exemplary embodiments of adaptive thermal management methods are described herein in the context of cores within a central processing unit ("CPU"), application of adaptive thermal management methodologies are not limited to cores within a CPU. It is envisioned that embodiments of adaptive thermal management methods may be extended to any component that may reside within a system on a chip ("SoC") and be operable at multiple performance levels such as, but not limited to, a graphical processing unit ("GPU"), a modem processor, a camera, etc. Further, it is envisioned that an adaptive thermal management algorithm maybe leveraged individually on any component within a SoC that may be operated a multiple performance levels. In such cases, it is also envisioned that each instance of a given adaptive thermal management algorithm on such components of the SoC may share its own performance state with other instances in order to determine the best possible performance state for the SoC in general within the thermal constraints.

As a non-limiting example of how an adaptive thermal management approach may be applied to a processing core in an exemplary PCD, assume that a discrete number of performance levels, P1, P2, P3, P4 ... P15 (where P15 represents a maximum performance level and P1 represents a lowest performance level) have been defined for the core. As one of ordinary skill in the art would understand, level P15 may be associated with both a high QoS level and a high thermal energy generation level for a given workload burden. Similarly, for the same workload burden, level P1 may be associated with both a low QoS level and a low thermal energy generation level. Assume also that:

a junction temperature limit threshold has been set at 125° C.;
a critical junction temperature limit has been set at 145° C.;
a PoP memory temperature limit threshold has been set at 85° C.;
a PCD skin temperature limit threshold has been set at 55° C.;
an algorithm reset time, ALGO_RESET_TIME, has been set at 30 seconds;
a high sampling rate, HIGH_SAMPLING_RATE, has been set at 50 ms;
a low sampling rate, LOW_SAMPLING_has been set at 250 ms; and
a penalty quantity, PENALTY_UNIT_has been set at 500 ms.

In the non-limiting example, sampling of temperature sensors associated, respectively, with die junctions, PoP memory components and PCD skin temperature begins after a preset initial threshold (lower than what would be recognized as a violation of any POP, skin or junction temperature threshold) is recognized to have been crossed. It is envisioned that, in some embodiments, triggering the initiation of sensor sampling may be accomplished by the use of interrupt based sensors. Once the interrupt is generated, an adaptive thermal management ("ATM") module and/or monitor module in the PCD begins monitoring the designated temperature sensors at some sampling rate, as explained below. Notably, as one of ordinary skill in the art will recognize, the various temperature sensors monitored in an adaptive thermal management system may generate temperature readings that closely indicate actual temperatures of the components with which the sensors are associated or, in the alternative, may generate temperature readings from which actual temperatures of certain components may be inferred.

Returning to the non-limiting example, in the event of a recognized junction temperature violation, the ATM module may run at a highest possible sampling rate, HIGH_SAMPLING_RATE. For skin and POP temperature violations, the ATM module may run at a slower rate, LOW_SAMPLING_RATE. Notably, as will become clear in the non-limiting example, in some embodiments the sampling rate may dictate the rate at which a processing component is clocked down.

When there are no violations and sampling has begun, the ATM module monitors the various temperature sensors at the LOW_SAMPLING_RATE. If a PoP or skin violation occurs in the absence of any junction violation, then the ATM module may continue at the LOW_SAMPLING_RATE. However, as soon as a junction violation occurs, the ATM module may change the sampling rate to the HIGH_SAMPLING_RATE. When all junction violations from all the processing components are cleared, the ATM module may return to the LOW_SAMPLING_RATE.

Before the initial temperature threshold mentioned above is exceeded, an exemplary core may be running at its maximum performance level, i.e. exemplary level P15. Even after the initial temperature threshold is exceeded, the core may continue to run at a P15 level so long as no junction, PoP or skin violation has been recorded. Notably, although the various embodiments described in this specification include temperature thresholds associated with junction, PoP and skin temperatures, it is envisioned that some embodiments of an adaptive thermal management system may not monitor junction, PoP and skin temperatures. That is, it is envisioned that some embodiments may monitor temperatures associated with other combinations of components and, as such, embodiments of an adaptive thermal management system and method will not be limited to specifically monitoring temperatures associated with the exemplary combinations of components illustrated in this description.

Returning to the non-limiting example, prior to recognition of any temperature violation, the performance level of an exemplary processing core is P15. A temperature threshold is exceeded and so the ATM module causes a RAMP_DOWN state to be entered. Depending on the sampling rate at which the ATM module is currently running, in the RAMP_DOWN state the performance level of the core is lowered one level at a time after each sampling interval until the temperature violation clears. So, suppose for example, for a certain workload which caused the temperature of the skin to exceed 55° C., the performance level of the core may decrease from P15 to P12 in three cycles sampled at LOW_SAMPLING_RATE, thereby causing the skin violation to be cleared in a total time of 750 ms after which the violation was first observed. Similarly, if the violation had been a junction violation which required six levels of performance reduction before the thermal energy generated by the core was mitigated to a point that enabled the violation to clear, then the core would have gone from performance level P15 to performance level P9 in 300 ms (in the event of a junction violation, the sampling rate would have changed to the 50 ms HIGH_SAMPLING_RATE). Once a safe performance level is reached, i.e. the maximum performance level at which the core may run without causing the given temperature threshold to be exceeded, a penalty timeout calculation may be applied, as explained below.

Notably, as one of ordinary skill in the art will recognize, clocking down the core can continue to occur only down to the P1 level. Once at the P1 performance level, the ATM module may elect to keep the core running at the P1 level if the observed violation were just a skin and/or POP violation. In such an event, it is envisioned that all processing components subject to the adaptive thermal management method may converge to their respective P1 performance level. This converging to the lowest available performance level may occur for any number of reasons including, but not limited to, thresholds not being set correctly or the ambient temperature to which the PCD is exposed being so high that thermal energy cannot be dissipated at a rate that would enable the violations to be cleared by any means. If a junction temperature threshold limit, such as the exemplary 145° C. critical junction limit, is exceeded the ATM module may elect to power collapse the core in an effort to avoid permanent damage to the core.

In some embodiments, a penalty may be applied in the RAMP_DOWN state only after clocking down has finished. So for example, after clearing the skin violation in the non-limiting example, the ATM module may cause a calculated penalty time to be spent before the core is authorized to go back to the P15 maximum performance level. In the example, the penalty duration was set for 500 ms so the ATM module will cause the core to remain at the last performance level of P12 for an additional 500 ms after the skin violation clears (i.e., 2 cycles at SLOW_SAMPLING_RATE). It is envisioned that some embodiments may not include a penalty period, however, other embodiments may include a preset, fixed penalty period. Still other embodiments may include a penalty period that accumulates in duration depending on how often and/or how long a core enters a RAMP_DOWN state.

As one of ordinary skill in the art would recognize, in the RAMP_DOWN state a system and method for adaptive thermal management may leverage means for throttling a core incrementally down to an optimum performance level. As more specifically described below, throttling strategies are various methods, applications and/or algorithms that may be employed by the PCD to increase its performance through adjustment of hardware and/or software parameters, such as the clock speed of a central processing unit ("CPU") or the like. Certain throttling strategies may increase performance of a PCD at the expense of increased thermal energy generation; however, certain other throttling strategies may mitigate a detrimental rise in operating temperature by reducing PCD performance. An exemplary throttling method that may be leveraged by an adaptive thermal management policy is a dynamic voltage and frequency scaling ("DVFS") method, described in more detail relative to FIG. 7. Even though the various exemplary embodiments described in this specification utilize throttling methodologies, such as DVFS, to mitigate thermal energy generation by a thermally aggressive processing component, it is envisioned that systems and methods for adaptive thermal management will not be limited to using throttling techniques in an effort to target a suitable operating temperature. That is, it is envisioned that some embodiments may additionally, or exclusively, leverage operating system level thermal mitigation techniques such as, but not limited to, workload shifting techniques.

FIG. 1 is a functional block diagram illustrating an exemplary embodiment of an on-chip system 102 for adaptive thermal management in a portable computing device 100. To set temperature thresholds for triggering the entry of a RAMP_DOWN state in which a processing component, such as CPU 110, is throttled off its maximum performance level in an effort to mitigate thermal energy generation, the on-chip system 102 may leverage various sensors 157 for measuring temperatures associated with various components such as cores 222, 224, 226, 228, PoP memory 112A and PCD outer shell 24. Advantageously, by monitoring the temperatures associated with the various components and incrementally throttling the performance levels of thermal aggressors 222, 224, 226, 228, the QoS experienced by a user of the PCD 100 may be optimized by avoiding unnecessary over-throttling. Moreover, the QoS experienced by a user of the PCD 100 may be further optimized by authorizing return to a maximum performance level at the earliest reasonable opportunity.

In general, the system employs two main modules which, in some embodiments, may be contained in a single module: (1) an adaptive thermal management ("ATM") module 101 for analyzing temperature readings monitored by a monitor module 114 (notably, monitor module 114 and ATM module 101 may be one and the same in some embodiments) and triggering entry into and out of a RAMP_DOWN policy state; and (2) a DVFS module 26 for implementing incremental throttling strategies on individual processing components according to instructions received from ATM module 101. Advantageously, embodiments of the system and method that include the two main modules leverage temperature data to optimize the performance level authorized for components 110 within the PCD 100 without risking thermal degradation to other components within the PCD 100 or exceeding critical temperature thresholds.

Figure 2:
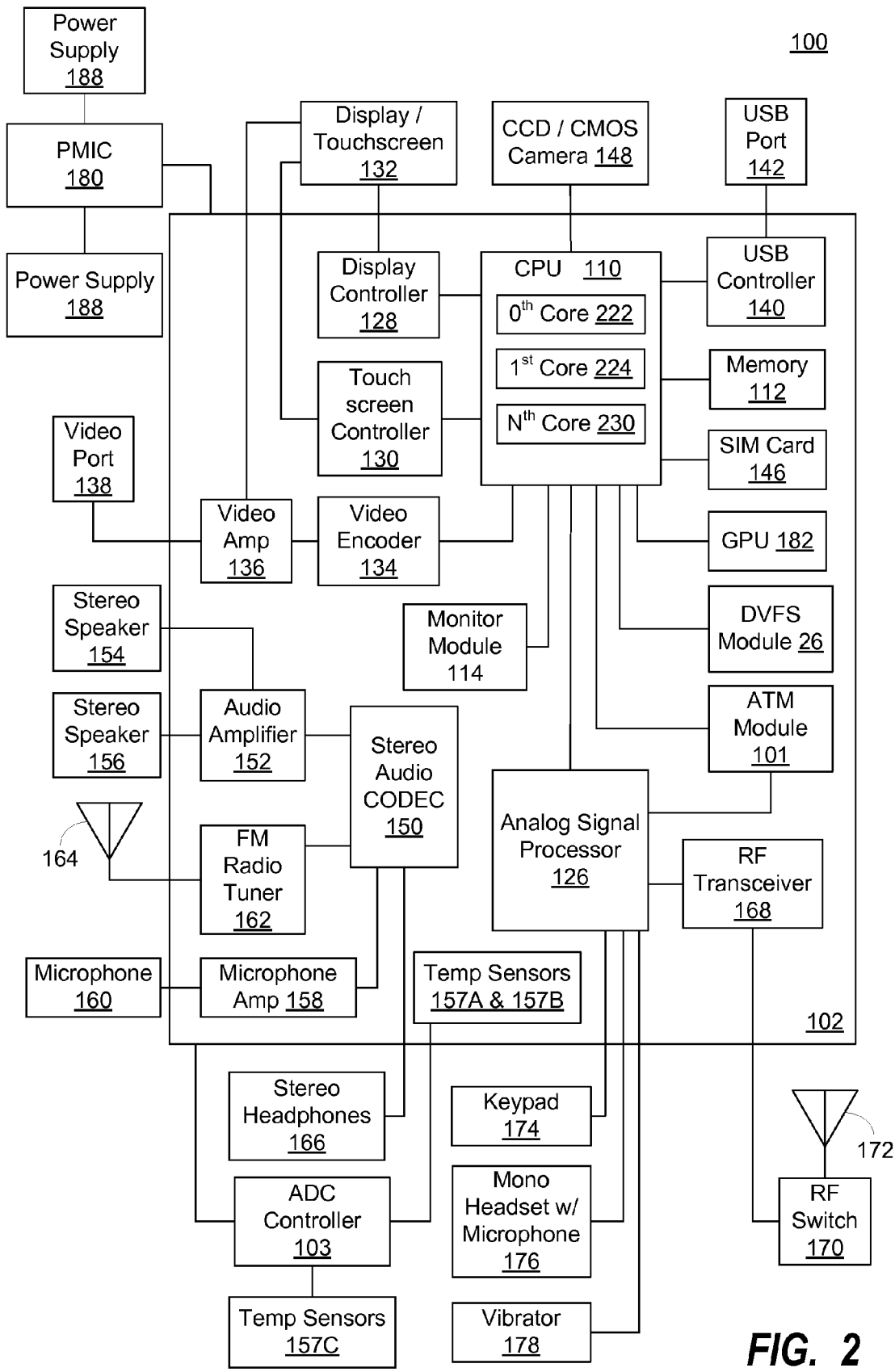
FIG. 2 is a functional block diagram illustrating an exemplary, non-limiting aspect of the PCD of FIG. 1 in the form of a wireless telephone for implementing methods and systems for adaptive thermal management of individual processing components based on temperature readings and current frequency/voltage levels at run time.

FIG. 2 is a functional block diagram illustrating an exemplary, non-limiting aspect of the PCD 100 of FIG. 1 in the form of a wireless telephone for implementing methods and systems for adaptive thermal management of individual processing components based on temperature readings and current frequency/voltage levels recognized at run time. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the dynamic voltage and frequency scaling ("DVFS") module 26 may be responsible for implementing throttling techniques to individual processing components, such as cores 222, 224, 230 in an incremental fashion to help a PCD 100 optimize its power level and maintain a high level of functionality without detrimentally exceeding certain temperature thresholds.

The monitor module 114 communicates with multiple operational sensors (e.g., thermal sensors 157A, 157B) distributed throughout the on-chip system 102 and with the CPU 110 of the PCD 100 as well as with the ATM module 101. In some embodiments, monitor module 114 may also monitor skin temperature sensors 157C for temperature readings associated with a touch temperature of PCD 100. In other embodiments, monitor module 114 may infer touch temperatures based on a likely delta with readings taken by on chip temperature sensors 157A, 157B. The ATM module 101 may work with the monitor module 114 to identify temperature thresholds that have been exceeded and instruct the application of throttling strategies to identified components within chip 102 in an effort to reduce the temperatures.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The DVFS module(s) 26 and ATM module(s) 101 may comprise software which is executed by the CPU 110. However, the DVFS module(s) 26 and ATM module(s) 101 may also be formed from hardware and/or firmware without departing from the scope of the invention. The ATM module(s) 101 in conjunction with the DVFS module(s) 26 may be responsible for applying throttling policies that may help a PCD 100 avoid thermal degradation while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more ATM module(s) 101 and DVFS module(s) 26. These instructions that form the module(s) 101, 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3A:
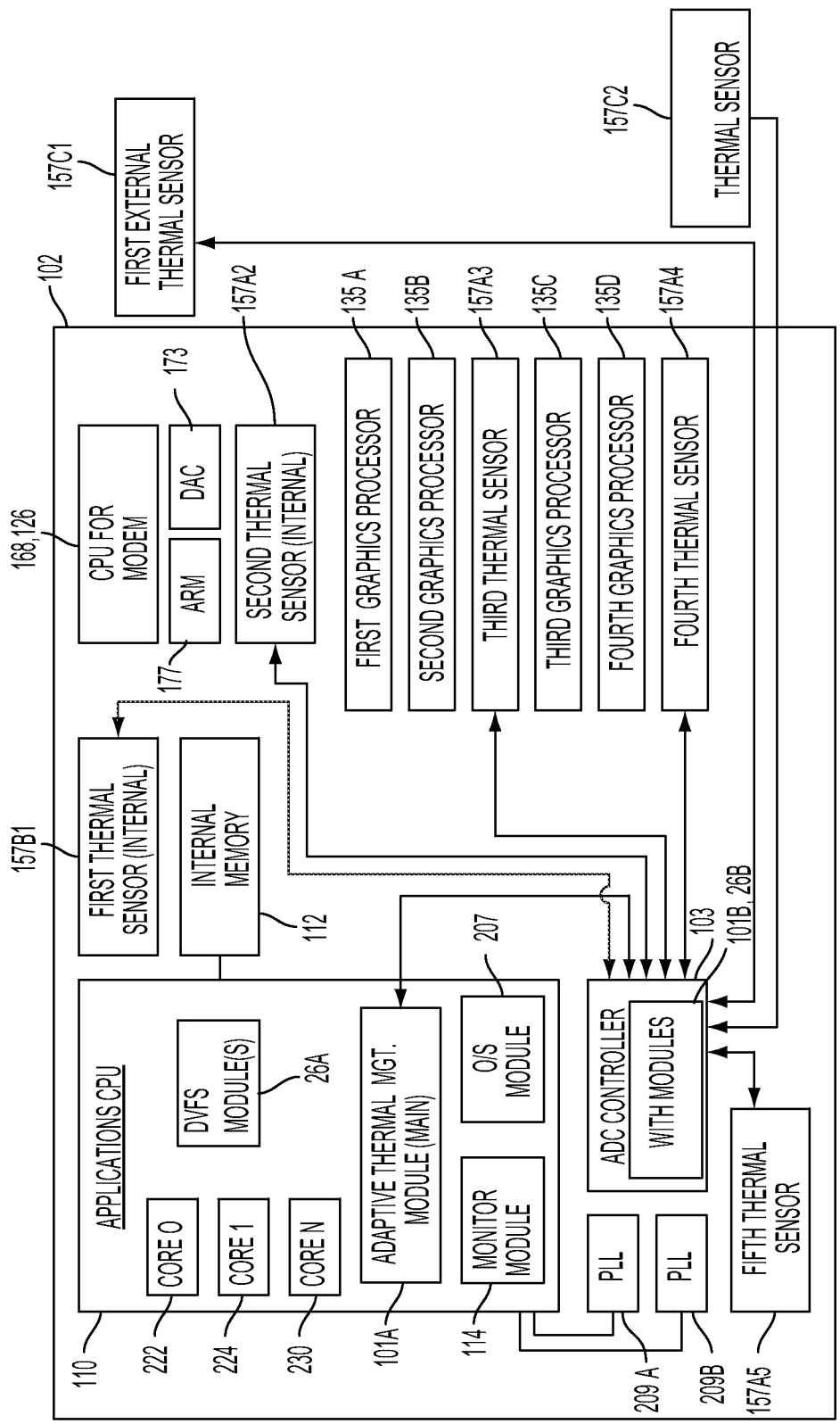
FIG. 3A is a functional block diagram illustrating an exemplary spatial arrangement of hardware for the chip illustrated in FIG. 2.

FIG. 3A is a functional block diagram illustrating an exemplary spatial arrangement of hardware for the chip 102 illustrated in FIG. 2. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing an ATM module 101A and/or DVFS module 26A (when embodied in software) or it may include an ATM module 101A and/or DVFS module 26A (when embodied in hardware). The application CPU 110 is further illustrated to include operating system ("O/S") module 207 and a monitor module 114. Further details about the monitor module 114 will be described below in connection with FIG. 3B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own adaptive thermal manager module 101B and/or DVFS module 26B that works in conjunction with the main modules 101A, 26A of the applications CPU 110.

The adaptive thermal manager 101B of the ADC controller 103 may be responsible for monitoring and tracking multiple thermal sensors 157 that may be provided "on-chip" 102 and "off-chip" 102. The on-chip or internal thermal sensors 157A, 157B may be positioned at various locations and associated with thermal aggressor(s) proximal to the locations (such as with sensor 157A3 next to second and third thermal graphics processors 135B and 135C) or temperature sensitive components (such as with sensor 157B1 next to memory 112).

As a non-limiting example, a first internal thermal sensor 157B1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157C may also be coupled to the ADC controller 103. The first external thermal sensor 157C1 may be positioned off-chip and adjacent to a top right quadrant of the chip 102 that may include the modem CPU 168, 126, the ARM 177, and DAC 173. A second external thermal sensor 157C2 may be positioned off-chip and adjacent to a lower right quadrant of the chip 102 that may include the third and fourth graphics processors 135C, 135D. Notably, one or more of external thermal sensors 157C may be leveraged to indicate the touch temperature of the PCD 100, i.e. the temperature that may be experienced by a user in contact with the PCD 100.

One of ordinary skill in the art will recognize that various other spatial arrangements of the hardware illustrated in FIG. 3A may be provided without departing from the scope of the invention. FIG. 3A illustrates yet one exemplary spatial arrangement and how the main ATM and DVFS modules 101A, 26A and ADC controller 103 with its ATM and DVFS modules 101B, 26B may recognize thermal conditions that are a function of the exemplary spatial arrangement illustrated in FIG. 3A, compare temperature thresholds with operating temperatures and/or touch temperatures and apply incremental throttling policies.

Figure 3B:
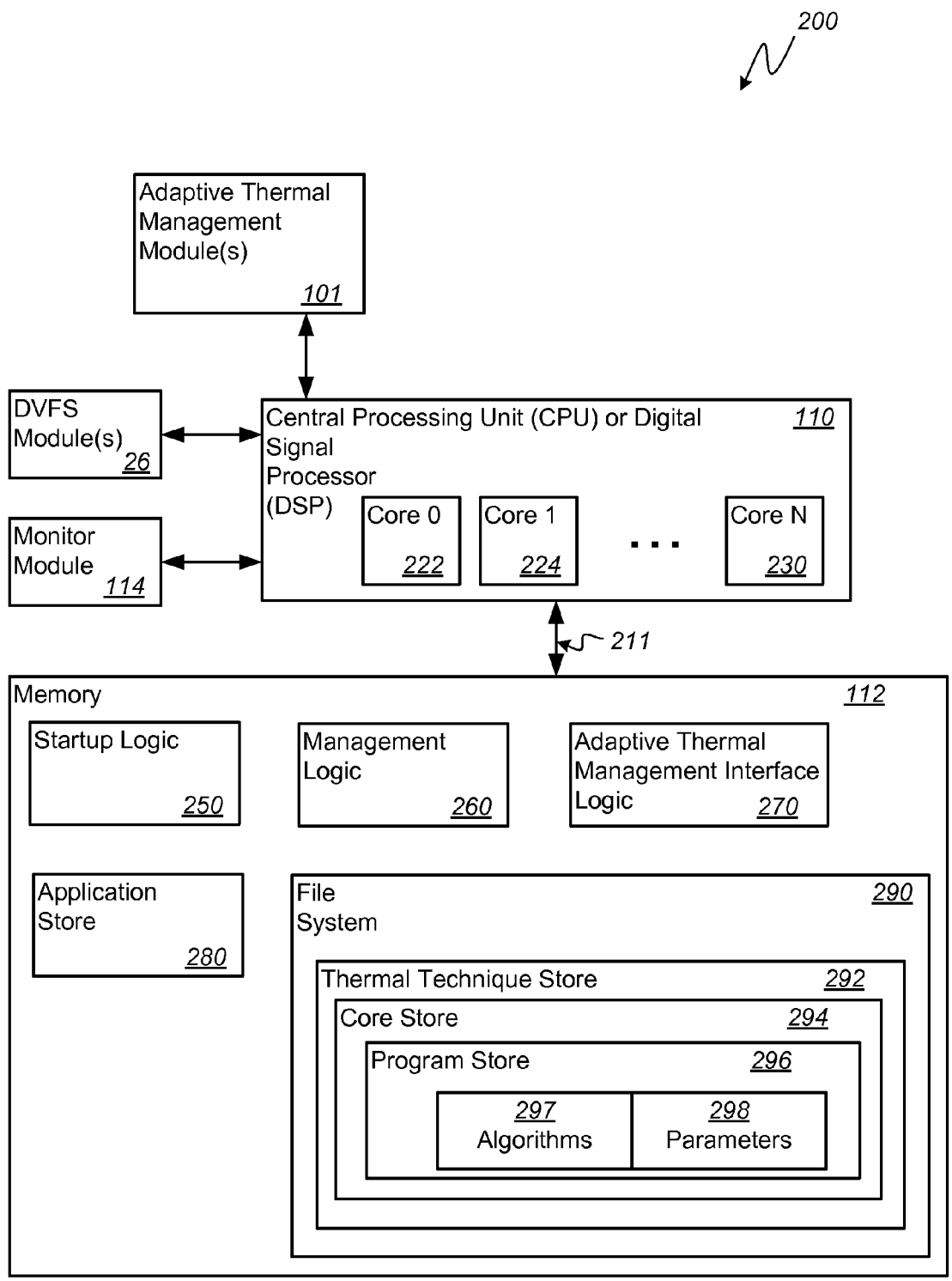
FIG. 3B is a schematic diagram illustrating an exemplary software architecture of the PCD of FIG. 2 for adaptive thermal management.

FIG. 3B is a schematic diagram illustrating an exemplary software architecture of the PCD 100 of FIG. 2 and FIG. 3A for supporting application of adaptive thermal management policies based on temperature thresholds. Any number of algorithms may form or be part of at least one thermal management policy that may be applied by the ATM module 101 when certain thermal conditions are met, however, in a preferred embodiment the ATM module 101 works with the DVFS module 26 to incrementally apply voltage and frequency scaling policies to individual thermal aggressors in chip 102 including, but not limited to, cores 222, 224 and 230.

As illustrated in FIG. 3B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the ATM module(s) 101 and/or DVFS module(s) 26 that may comprise software and/or hardware. If embodied as software, the module(s) 101, 26 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 3B, it should be noted that one or more of startup logic 250, management logic 260, adaptive thermal management interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the adaptive thermal management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the comparison, by the ATM module 101, of various temperature measurements with threshold temperature settings associated with a PCD component or aspect. An exemplary select program can be found in the program store 296 of the embedded file system 290 and is defined by a specific combination of a performance scaling algorithm 297 and a set of parameters 298. The exemplary select program, when executed by one or more of the core processors in the CPU 110 may operate in accordance with one or more signals provided by the monitor module 114 in combination with control signals provided by the one or more ATM module(s) 101 and DVFS module(s) 26 to scale the performance of the respective processor core "up" or "down." In this regard, the monitor module 114 may provide one or more indicators of events, processes, applications, resource status conditions, elapsed time, as well as temperature as received from the ATM module 101.

The management logic 260 includes one or more executable instructions for terminating a thermal management program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and, in some embodiments, may be defined by a specific combination of a performance scaling algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the ATM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and thermal management algorithms 297 used by the PCD 100. As shown in FIG. 3B, the store 292 includes a core store 294, which includes a program store 296, which includes one or more thermal management programs.

FIG. 4, which includes FIGS. 4A-4D, is a logical flowchart illustrating a method 400 for adaptive management of thermal energy generation in the PCD 100. Method 400 of FIG. 4 starts with a first block 402 in which initial parameters are set. The parameters include a reset time parameter, high and low sampling rates, penalty time unit and temperature thresholds.

Once the parameters are set, at block 404 an adaptive thermal management module 101 may work in conjunction with monitor module 114 to monitor the various temperature threshold parameters. In an exemplary embodiment, the temperature thresholds may be associated with core junctions, PoP memory components and skin temperature of the PCD 100.

As the sensors associated with the various temperature thresholds are monitored at block 404, at decision block 406 it is determined whether an initial threshold has been exceeded. The initial threshold may be significantly lower than any temperature threshold associated with a junction, PoP or skin aspect. If the initial threshold has not be exceeded, the "no" branch is followed back to block 404 and the sensors are further monitored. If the initial threshold is violated, an interrupt signal is sent to the monitor module 114 and/or ATM module 101 and the "yes" branch is followed to block 408. At block 408, sampling of the various sensors 157 is initiated at a low sampling rate.

With the sensors being monitored at a low sampling rate at block 408, the junction temperature, PoP temperature and/or skin temperature are compared to their respective preset thresholds. If at decision blocks 410 and 412 it is verified that none of the junction, PoP and/or touch temperature thresholds have been exceeded, the "no" branches are followed to block 414 and the sensors are sampled again at the next interval. Notably, as one of ordinary skill in the art would recognize, the interval duration is dictated by the sampling rate which, at block 414, remains as a low sampling rate. At decision block 416, after the additional time interval of block 414, if it is determined that the initial threshold violation cleared, then the "yes" branch is followed to block 418 and the sampling effort ends. Notably, to this point in method 400, an exemplary core has been running at a maximum performance level.

Returning to decision block 416, if it is determined that the initial temperature threshold violation has not been cleared, the "no" branch is followed back to decision blocks 410 and 412. Assuming that there are still no junction, PoP and/or skin temperature violations at decision blocks 410 and 412, the cycle repeats for another interval at the low sampling rate. If at decision block 410, however, it is determined that a junction temperature limit has been exceeded, then the "yes" branch is followed to block 420 (FIG. 4B). Similarly, if at decision block 412 it is determined that a PoP or skin temperature limit has been violated, the "yes" branch is followed to block 438 (FIG. 4C).

Assuming for now that no junction limit has been violated but a PoP and/or skin temperature limit has been violated, the method 400 proceeds from decision block 412 to block 438 where the exemplary processing core is throttled from a maximum performance level an immediately lesser performance level. The sampling rate continues at the low sampling rate and, at the next interval, decision block 440 inquires as to whether the PoP and/or skin temperature threshold violation has been cleared. That is, given that the performance level of the exemplary core was reduced one bin from the default maximum performance level, at decision block 440 it is determined whether such reduction in power consumption was adequate to mitigate the thermal energy generation such that the temperature reading fell back below the threshold. If the threshold violation cleared, then the "yes" branch is followed to block 448 and the reduced performance level is maintained for a period of time equal to the penalty period configured in block 402. Notably, in some embodiments, it is envisioned that the penalty period may not be imposed at this point in the method 400 because the workload was not heavy enough to warrant a severe, multi-level throttling of the exemplary core before being allowed to increase back to its maximum performance level at block 450.

Regarding the penalty period, it is envisioned that some embodiments may not leverage a penalty period at all. Other embodiments may impose a penalty period when only certain conditions are met such as, but not limited to, reentry into the RAMP_DOWN state before a reset period expires. Still other embodiments may increase the penalty period as the adaptive thermal management methodology progresses through the processing of various workloads.

Returning to the method 400, if at decision block 440 it is determined that the PoP and/or skin temperature threshold violation has not cleared after the sampling interval, the "no" branch is followed to decision block 442 and it is determined whether a next lower power level is available for the exemplary core. If so, then the core remains in the RAMP_DOWN state and the power level of the exemplary core is reduced by an additional single bin at block 444. The sampling continues at the low sampling rate for an additional interval at block 446 and the method returns to decision block 440 where the thresholds are checked again for clearance.

If at decision block 442 it is determined that a next lower performance level is not available for the exemplary processing component, i.e. the ramp down cycle has continued without clearing the temperature violation until the processor is running at its lowest available power level, then the "no" branch is followed to block 452 and the lowest performance level is maintained. The PoP and/or touch temperature violation(s) are continually checked at the low sample rate intervals at decision block 454 until all are cleared. Once all PoP and/or touch temperature violations are cleared, the "yes" branch is followed from decision block 454 to block 448. As described above, at block 448 the penalty period, if any, is imposed and the exemplary processing component remains at its lowest power level for the duration of the penalty period before receiving authorization to increase back to its maximum performance level at block 450.

Figure 4A:
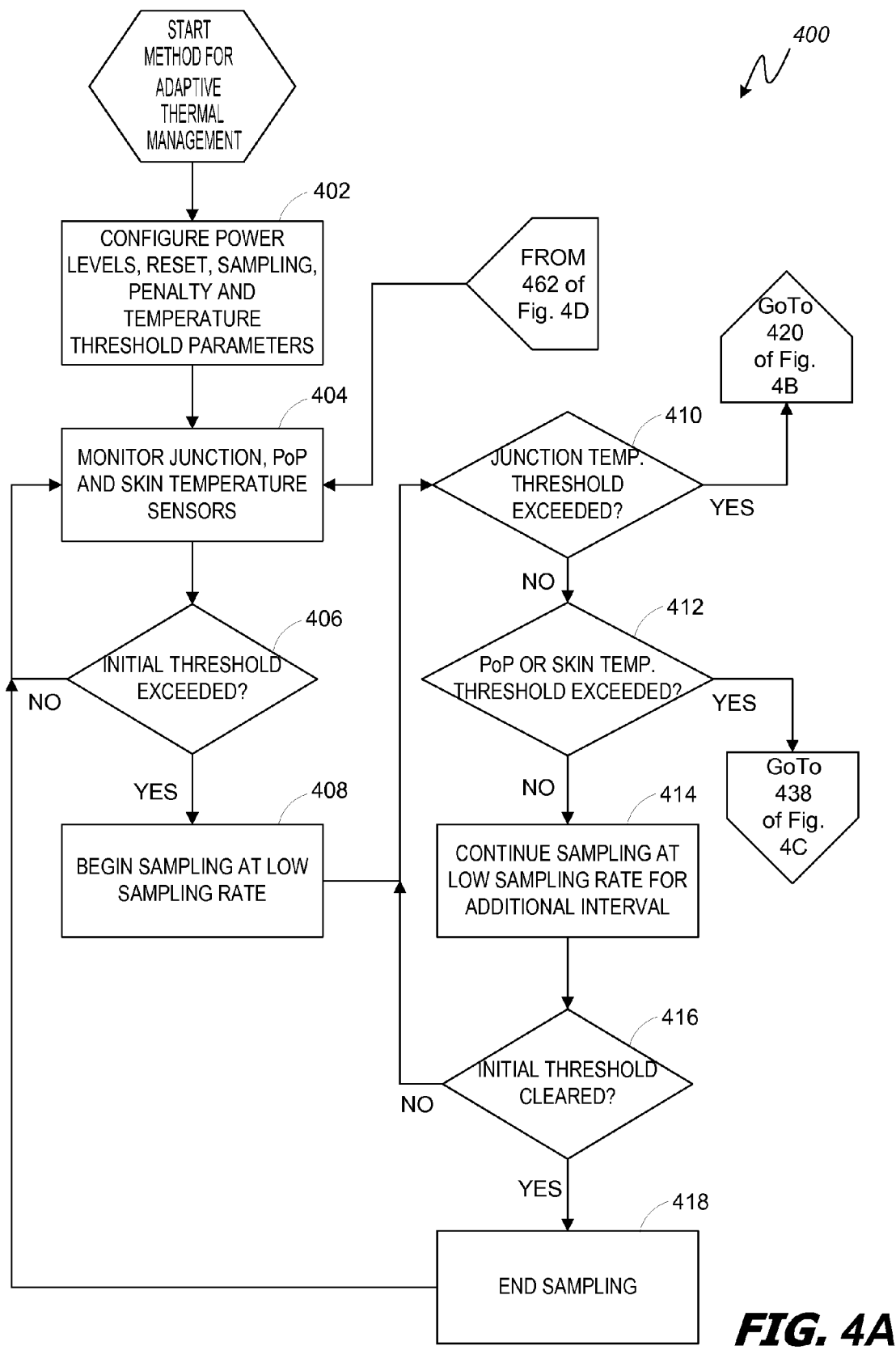
FIGS. 4A-4D are logical flowcharts illustrating a method for adaptive management of thermal energy generation in the PCD of FIG. 1.
Figure 4B:
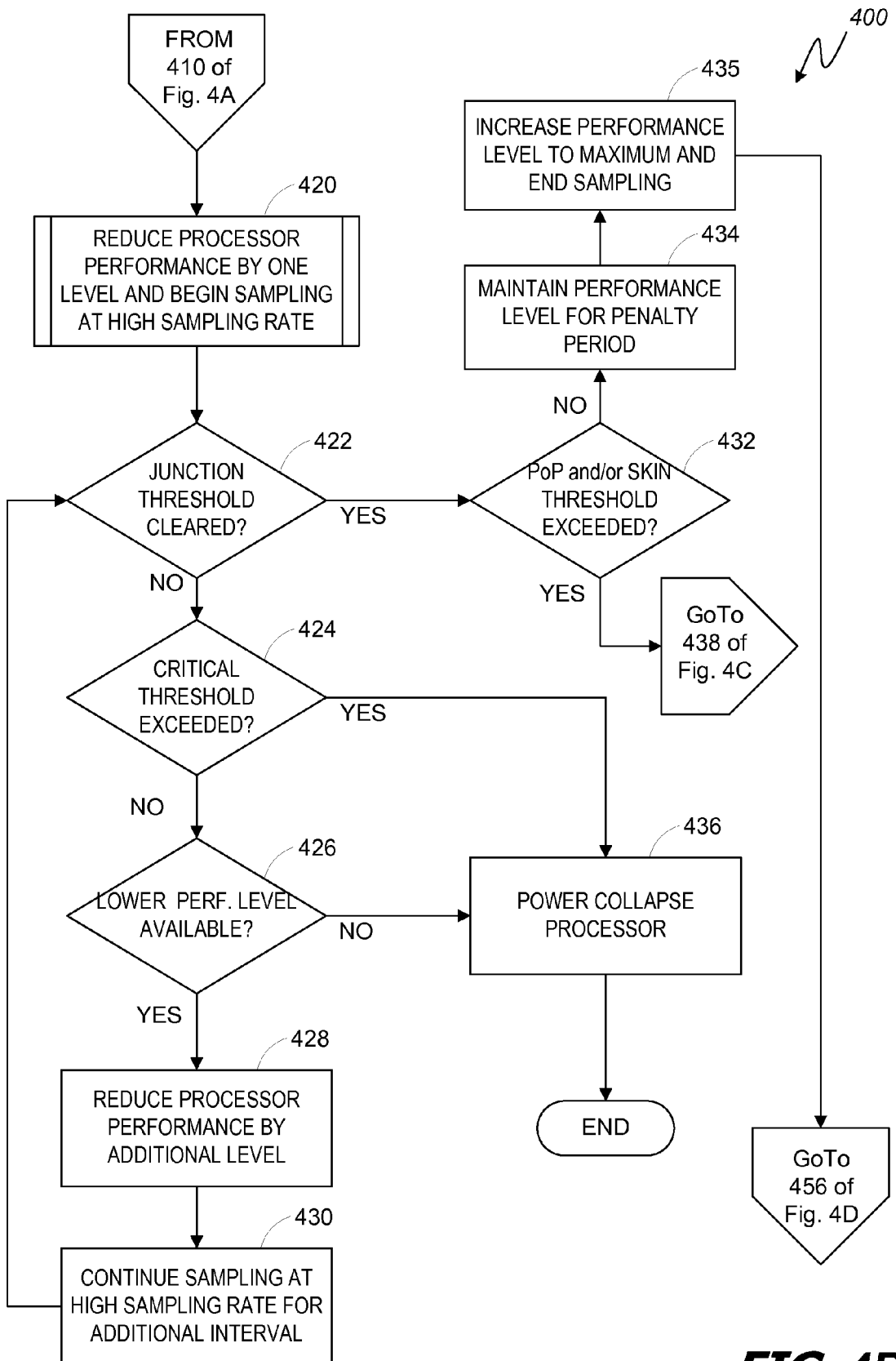
Figure 4C:
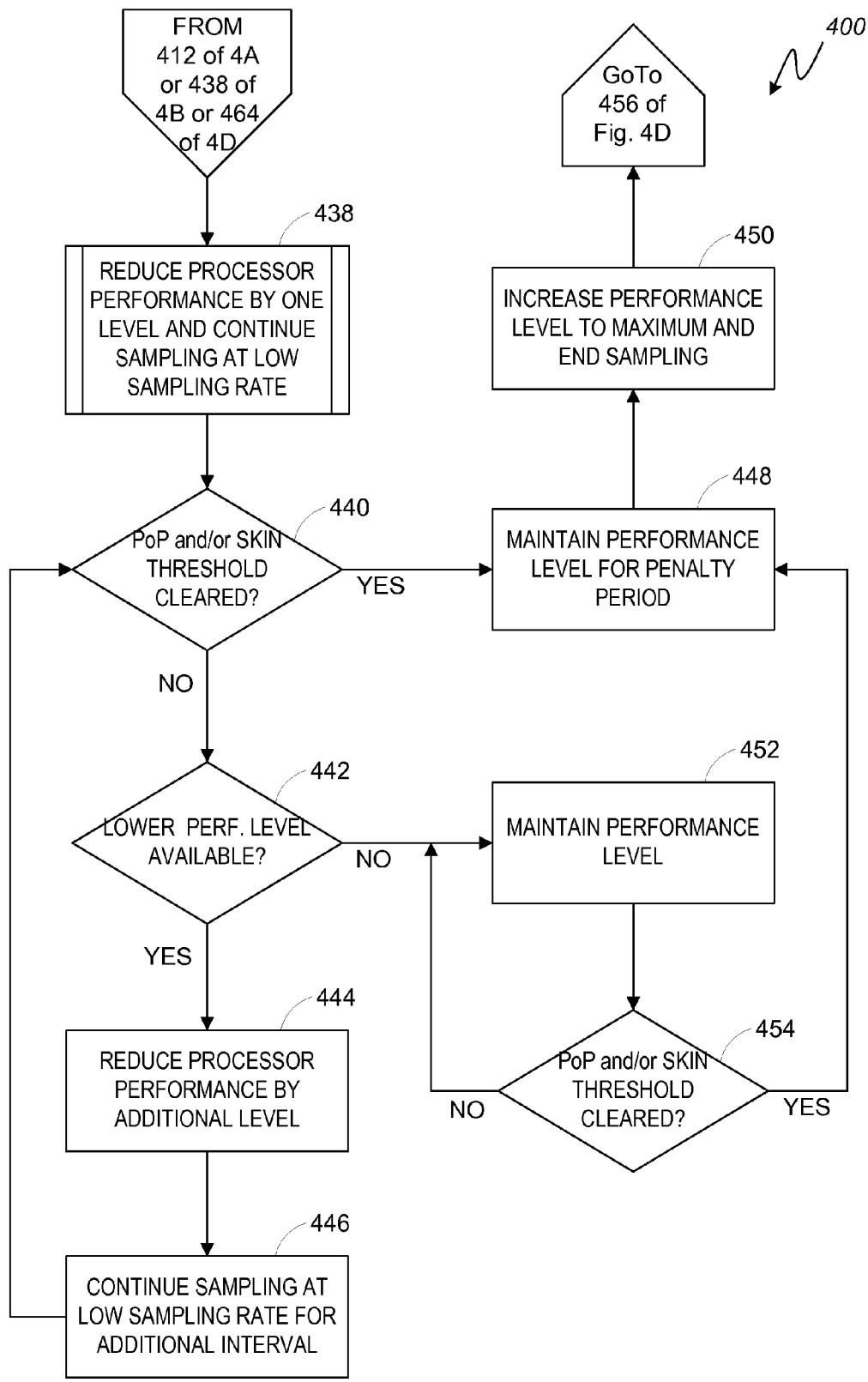
Figure 4D:
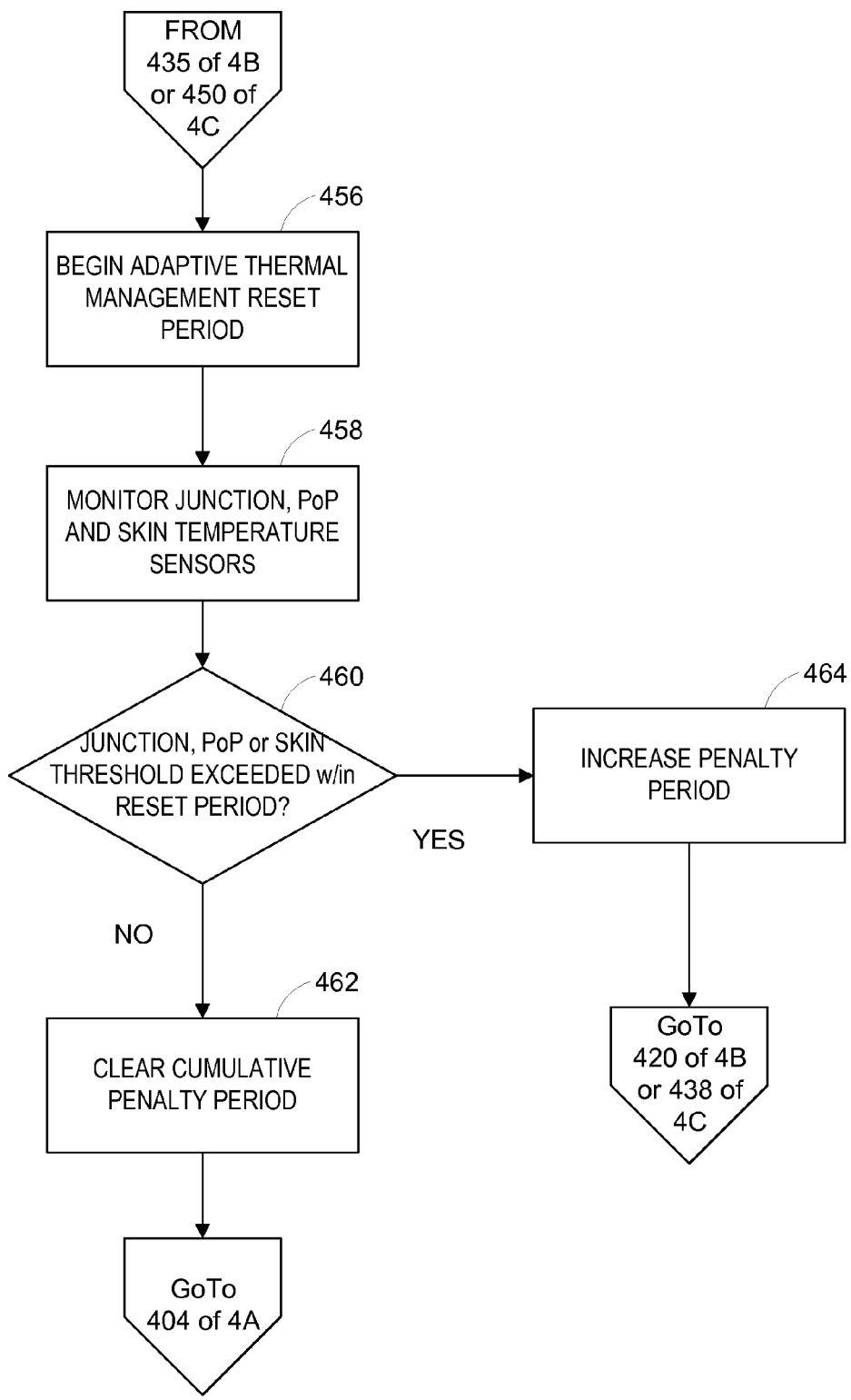

Once the exemplary core is allowed to exit the RAMP_DOWN state at block 450 and increase its power level back to a maximum, the method 400 proceeds to block 456 of FIG. 4D. At block 456, certain methods for adaptive thermal management may impose a reset period that was configured at block 402. During the reset period, at block 458, the various temperature sensors 157 are monitored and their readings compared against the associated temperature thresholds. If at decision block 460, it is determined that the thresholds were not violated during the reset period, then the "no" branch is followed to block 462 and any penalty period that may have accumulated to that point is cleared and the process returns to block 404 of FIG. 4A. If, however, at decision block 460 it is determined that any of the various thresholds are violated prior to the reset period ending, then the penalty period may be increased at block 464 by the penalty value.

In this way, a heavy workload that causes a temperature threshold to be violated almost immediately after the core is authorized to exit the RAMP_DOWN state will influence the duration that the core remains in the RAMP_DOWN state upon reentry, thereby steadily increasing opportunity for thermal energy dissipation until the workload is completed. Subsequent to block 464, the method 400 proceeds to either block 420 or block 438. Notably, if the temperature threshold that was violated prior to the reset period terminating was either a PoP or skin temperature threshold, then the process returns to block 438 of FIG. 4C and the method proceeds as described above, with the exception that any penalty period imposed at block 448 will have been increased as a result of the action taken at block 464. If, however, the temperature threshold that was violated prior to the reset period terminating was a junction temperature threshold, then the process returns to block 420 of FIG. 4B and the method proceeds as will be described below, with the exception that any penalty period imposed at block 434 will be increased as a result of the action taken at block 464.

Returning to decision block 410 of FIG. 4A, if the junction temperature threshold is exceeded, then the "yes" branch is followed to block 420 of FIG. 4B. Notably, as one of ordinary skill in the art will understand, temperatures associated with junction aspects of processing components in a PCD may be critical to the health of the PCD.

At block 420, the power level of the exemplary core is reduced by one level and the temperature sensor 157A associated with the junction of the core is sampled at a high sampling rate. After one sample interval, the temperatures sensor 157A is checked to determine whether the junction limit violation cleared as a result of the reduced power level. If not, the "no" branch is followed to decision block 424 and it is determined whether a higher, more critical threshold has been exceeded in the meantime. Notably, under a thermal runaway condition, for example, the temperature of the core could continue to rise regardless of the reduction in power level to the core. If a critical temperature level has been exceeded, the "yes" branch is followed from decision block 424 to block 436 and the power to the core is collapsed. By shutting the core down at block 436, thermal degradation of the core may be avoided and the health of the PCD maintained.

Returning to decision block 424, if the critical threshold has not been violated (yet the junction threshold violation has not cleared per block 422) then the "no" branch is followed to decision block 426. At decision block 426 it is determined whether a lower performance level is available and, if so, the "yes" branch is followed to block 428. If not, the "no" branch is followed to block 436 and the core is power collapsed. In some embodiments, the core may be maintained at the lowest level in lieu of power collapsing in the hope that the junction threshold violation may subsequently clear.

If a next lower power level is available and applied at block 428 then at block 430 the high sampling rate is continued and the process returns to decision block 422. If at any time at decision block 422 it is determined that the junction temperature threshold violation clears, then the "yes" branch is followed to decision block 432. At decision block 432, it is determined whether there remains a PoP and/or touch temperature violation and, if so, the "yes" branch is followed back to block 438 of FIG. 4C (described above). If no PoP and/or skin temperature violation is recognized at decision block 432 (i.e., all violations have cleared), then the "no" branch is followed to block 434. At block 434, the performance level to which the exemplary core was reduced during the RAMP_DOWN period is maintained for the penalty period. At the end of the penalty period, at block 435 the exemplary processing component is authorized to exit the RAMP_DOWN period and resume processing workloads at its maximum power level. The process returns to block 456 of FIG. 4D for application of the reset period and possible adjustment of a subsequent penalty period.

Figure 5:
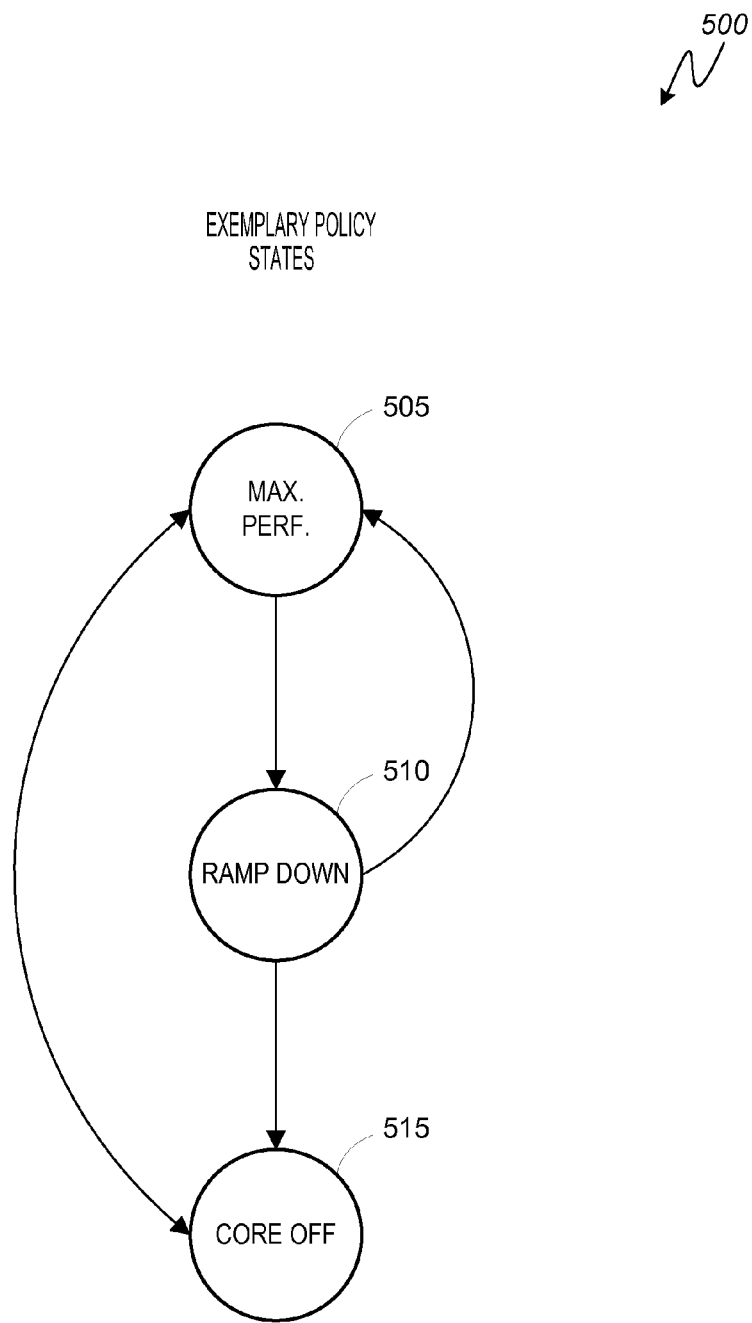
FIG. 5 is an exemplary state diagram that illustrates various adaptive thermal management policy states triggered by temperature readings associated with various areas or components within the PCD of FIG. 1 and past behavior of processing components within the PCD of FIG. 1.

FIG. 5 is an exemplary state diagram 500 that illustrates various adaptive thermal management policy states 505, 510, 515 triggered by temperature readings associated with sensors 157 within the PCD of FIG. 1. The first policy state 505 may comprise a MAX_PERF state in which the ATM module 101 has authorized an exemplary processing component to process workloads at a maximum performance level. As described above, the processing component may remain in the MAX_PERF state unless and until a temperature threshold violation is recognized.

In the event that a temperature threshold violation is recognized while a processing component is in the MAX_PERF state, the ATM module 101 may instruct the processing component to enter the second policy state 510 and ramp down its performance level by one bin. In the RAMP_DOWN state, the power level of the processing component is systematically and incrementally reduced until thermal energy generation by the component reaches a level that allows the observed threshold violation to clear. Once all violations are cleared, the processing component may be authorized to exit the RAMP_DOWN state and increase its power level back to maximum.

When in the RAMP_DOWN policy state, the ATM module 101 may work with a DVFS module 26 to continue to take the performance level of the processing component down one bin at a time until the highest power consumption level at which the thermally aggressive processing component may operate without causing a temperature violation is determined. In this way, it is an advantage of adaptive thermal management systems and methods that user experience and QoS may be optimized regardless of PCD form factor or specific workload being processed.

If one or more temperature thresholds are not cleared as a result of the reduced power levels in the RAMP_DOWN state, the processing component may be instructed by the ATM module 101 to enter the third policy state 515, CORE_OFF and power collapse. A processing component may be power collapsed in an effort to avoid thermal runaway and permanent thermal degradation to the component. Subsequent to being power collapsed in the CORE_OFF state, the processing component may be rebooted to MAX_PERF state after all violations have cleared.

FIG. 6 is a diagram illustrating exemplary conditions associated with the particular policy states 505, 510, 515 illustrated in FIG. 5. While in the MAX_PERF state 505, a processing component may be contributing to temperature conditions that exceed an initial threshold but no temperature has been recognized as exceeding a thermal threshold associated with a junction limit, PoP memory limit and/or touch temperature limit. Accordingly, the processing component may run at full power and frequency, thus processing workloads at its highest efficiency. The MAX_PERF state 505 is characterized by low sampling rates, if any sampling rate, and high QoS and user experience.

In the second RAMP_DOWN state 510, a temperature threshold may have been exceeded such that reducing power to the processing component is warranted in an effort to reduce the thermal energy generation and clear the temperature violation. As described above, the power level may be incrementally reduced until the violation is cleared. In this way, the maximum processing level at which the processor may operate without causing the given temperature threshold to be violated is determined A processing component in the second RAMP_DOWN state 510 may remain in the RAMP_DOWN state 510 for a penalty period after all temperature violations have been cleared. The RAMP_DOWN state 510 is characterized by reduced QoS and user experience, although the QoS is optimized in light of the temperature conditions sought to be managed.

In the third CORE_OFF state 510, a processing component may be power collapsed in an effort to avoid permanent damage to the component or other components within PCD 100. In certain embodiments, a processing component may enter the CORE_OFF state 515 as a result of a junction temperature limit being exceeded without clearing in the RAMP_DOWN state 510.

Figure 7:
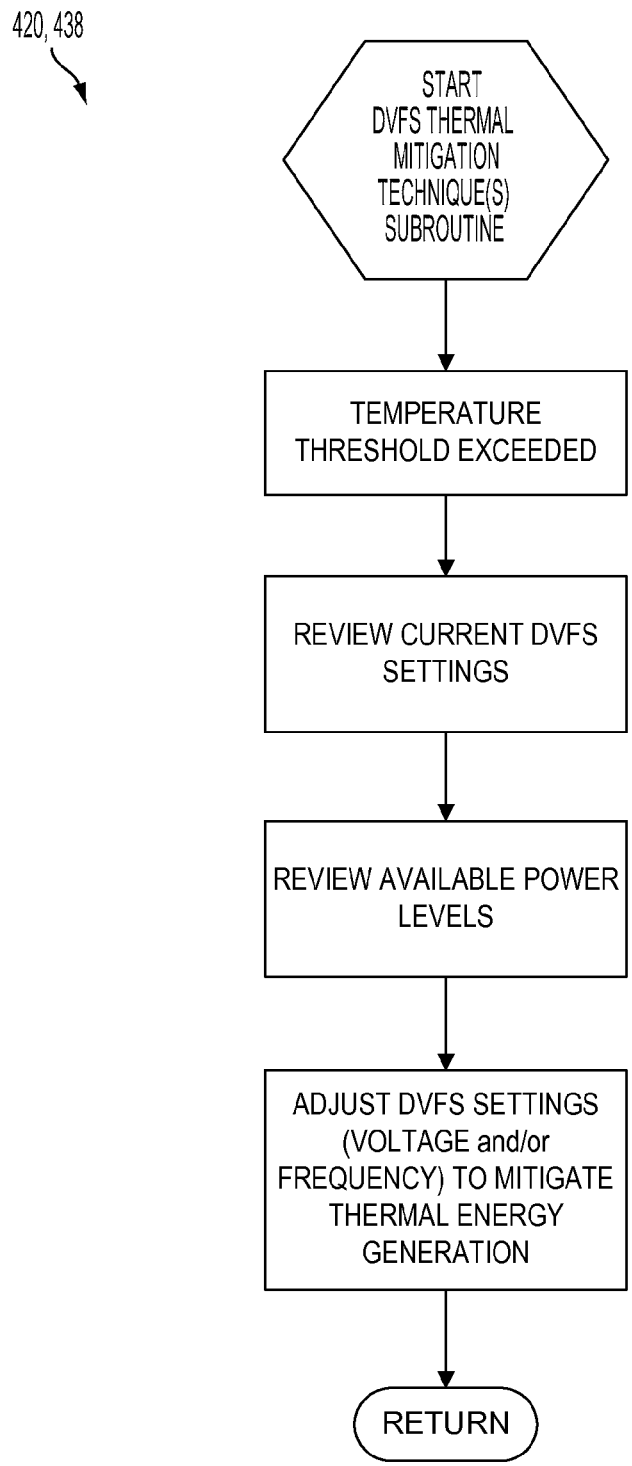
FIG. 7 is a logical flowchart illustrating sub-method or subroutines for applying dynamic voltage and frequency scaling ("DVFS") thermal mitigation techniques.

FIG. 7 is a logical flowchart illustrating sub-method or subroutine 420, 438 for applying dynamic voltage and frequency scaling ("DVFS") thermal mitigation techniques. As described above, DVFS techniques may be leveraged by an ATM module 101 in the application of adaptive thermal management policies. In certain embodiments, the DVFS throttling techniques may be applied to individual processing components in an incremental manner, reducing the power levels to a given core one bin at a time until a temperature violation clears.

As understood by one of ordinary skill in the art, the demand for processors that provide high performance and low power consumption has led to the use of various power management techniques, such as, dynamic voltage and frequency scaling, sometimes referred to as dynamic voltage and current scaling ("DVCS"), in processor designs. DVFS enables trade-offs between power consumption and performance. Processors 110 and 126, for instance, may be designed to take advantage of DVFS by allowing the clock frequency of each processor to be adjusted with a corresponding adjustment in voltage.

A reduction in operating voltage usually results in a proportional savings in power consumed. One main issue for DVFS enabled processors 110, 126 is how to control the balance between performance and power savings.

Block 705 is the first step in the submethod or subroutine 420, 438 for applying DVFS thermal mitigation techniques in an adaptive thermal management framework. In this first block 705, the ATM module 101 may determine that a temperature threshold, such as a junction threshold, has been violated based on temperature readings provided by thermal sensors 157A. Accordingly, the ATM module 101 may then instruct the processing component to enter the RAMP_DOWN state 510 and initiate instructions to the DVFS module 26 to review the current DVFS settings in block 710. Next, in block 715, the DVFS module 26 may determine that the power level of the processing component can be reduced.

Next, in block 720, the DVFS module 26 may adjust or issue commands to incrementally adjust the current DVFS settings that may include voltage and/or frequency, in order to mitigate thermal loading conditions. Adjusting the settings may comprise adjusting or "scaling" the maximum clock frequency allowed in DVFS algorithm. As described above, the DVFS module 26 may be dedicated to a processing component and incrementally adjust the power level to the processing component one bin at a time until instructed by the ATM module 101 that no further reduction DVFS settings is required. Notably, although the monitor module 114, ATM module 101 and DVFS module 26 have been described in the present disclosure as separate modules with separate functionality, it will be understood that in some embodiments the various modules, or aspects of the various modules, may be combined into a common module for implementing adaptive thermal management policies.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for adaptive thermal management in a portable computing device ("PCD"), the method comprising:
    defining a discrete number of performance levels for one or more processing components in the PCD, wherein each of the performance levels is associated with a voltage and clock frequency supplied to the one or more processing components;
    monitoring a plurality of temperature sensors in the PCD, wherein each temperature sensor is associated with one or more of temperature sensitive components;
    receiving an interrupt signal from one of the plurality of temperature sensors;
    sampling temperature signals from one or more of the plurality of temperature sensors;

determining that a particular temperature signal indicates that at a temperature threshold associated with one of the temperature sensitive components has been violated;

reducing the performance level of one or more of the processing components from a maximum performance level to a next highest performance level within the defined discrete number of performance levels responsive to the indication that the temperature threshold has been violated;

continuing to sample the particular temperature signal;

determining from the particular temperature signal that the temperature threshold violation has cleared;

increasing the performance level of the one or more processing components from the next highest performance level to the maximum performance level at the conclusion of a first penalty period having a predetermined duration; and monitoring the plurality of temperature sensors for a reset period, wherein:
   if, during the reset period, the particular temperature signal indicates that the temperature threshold has been re-violated, the duration of a subsequent penalty period is increased relative to the duration of the first penalty period; and
   if, during the reset period, the particular temperature signal indicates that the temperature threshold has not been re-violated, the duration of a subsequent penalty period is reset to a default duration.

2. The method of claim 1, wherein each of the temperature sensitive components is selected from a group comprised of a junction component, a package on package ("PoP") memory component and an outer shell component.

3. The method of claim 1, further comprising:
defining a plurality of temperature thresholds associated with the one or more temperature sensitive components in the PCD.

4. The method of claim 3, wherein at least one of the plurality temperature thresholds is associated with a package on package ("PoP") memory component.

5. The method of claim 3, wherein at least one of the plurality of temperature thresholds is associated with an outer shell component.

6. The method of claim 3, wherein at least one of the plurality of temperature thresholds is associated with a junction component.

7. The method of claim 1, further comprising:
prior to increasing the performance level of the one or more processing components from the next highest performance level to the maximum performance level at the conclusion of the first penalty period, holding the performance level of the one or more processing components at the next highest performance level during the first penalty period after the at least one temperature threshold violation has cleared.

8. The method of claim 1, further comprising modifying the sampling of temperature signals from one or more of the plurality of temperature sensors to a second sample rate, wherein the second sample rate comprises time intervals that are shorter in duration than the time intervals of the original sampling.

9. The method of claim 8, further comprising:
sampling at the second sample rate, the particular temperature signal that indicated that the temperature threshold was violated;
determining from the particular temperature signal that the temperature threshold remains violated; and
further reducing, by a single level, the performance level of the one or more processing components from the next highest performance level within the defined discrete number of performance levels.

10. The method of claim 8, further comprising:
sampling at the second sample rate, the particular temperature signal that indicated that the temperature threshold was violated;
determining from the particular temperature signal that the temperature threshold violation has cleared; and
increasing the performance level of the one or more processing components from the next highest performance level to the maximum performance level.

11. A computer system for adaptive thermal management in a portable computing device ("PCD"), the system comprising:
a dynamic voltage and frequency scaling ("DVFS") module, configured to:
   define a discrete number of performance levels for one or more processing components in the PCD, wherein each of the performance levels is associated with a voltage and clock frequency supplied to the one or more processing components; and
   adjust the performance level of one or more of the processing components within the defined discrete number of performance levels; and
an adaptive thermal management ("ATM") module, configured to:
monitor a plurality of temperature sensors in the PCD, wherein each temperature sensor is associated with one or more of the temperature sensitive components;
receive an interrupt signal from one of the plurality of temperature sensors;
sample temperature signals from one or more of the plurality of temperature sensors; and
determine that a particular temperature signal indicates that a temperature threshold associated with one of the temperature sensitive components has been violated;
instruct the DVFS module to reduce the performance level of one or more of the processing components from a maximum performance level to a next highest performance level within the defined discrete number of performance levels responsive to the indication that the temperature threshold has been violated;
continue to sample the particular temperature signal after the performance level of one or more of the processing components has been reduced from a maximum performance level to a next highest performance level;
determine from the particular temperature signal that the temperature threshold violation has cleared;
instruct the DVFS module to increase the performance level of the one or more processing components from the next highest performance level to the maximum performance level at the conclusion of a first penalty period having a predetermined duration; and
monitor the plurality of temperature sensors for a reset period, wherein:
   if, during the reset period, the particular signal indicates that the temperature threshold has been re-violated, the duration of a subsequent penalty period is increased relative to the duration of the first penalty period; and
   if, during the reset period, the particular temperature signal indicates that the temperature threshold has not been re-violated, the duration of a subsequent penalty period is reset to a default duration.

12. The computer system of claim 11, wherein each of the temperature sensitive components is selected from a group comprised of a junction component, a package on package ("PoP") memory component and an outer shell component.

13. The computer system of claim 11, wherein the DVFS module is further configured to:
define a plurality of thresholds associated with the one or more temperature sensitive components in the PCD.

14. The computer system of claim 13, wherein at least one of the plurality of temperature thresholds is associated with a package on package ("PoP") memory component.

15. The computer system of claim 13, wherein at least one of the plurality if temperature thresholds is associated with an outer shell component.

16. The computer system of claim 13, wherein at least one of the plurality if temperature thresholds is associated with a junction component.

17. The computer system of claim 11, wherein the DVFS module is further configured to:
prior to increasing the performance level of the one or more processing components from the next highest performance level to the maximum performance level at the conclusion of the first penalty period, holding the performance level of the one or more processing components at the next highest performance level during the first penalty period after the at least one temperature threshold violation has cleared.

18. The computer system of claim 11, wherein the ATM module is further configured to:
modify the sampling of temperature signals from one or more of the plurality of temperature sensors to a second sample rate, wherein the second sample rate comprises time intervals that are shorter in duration than the time intervals of the original sampling.

19. The computer system of claim 18, wherein:
the ATM module is further configured to:
sample at the second sample rate, the particular temperature signal that indicated that the temperature threshold was violated;
determining from the particular temperature signal that the temperature threshold remains violated; and
the DVFS module is further configured to:
further reduce, by a single level, the performance level of the one or more processing components from the next highest performance level within the defined discrete number of performance levels.

20. The computer system of claim 18, wherein:
the ATM module is further configured to:
sample at the second sample rate, the particular temperature signal that indicated that the temperature threshold was violated;
determine from the particular temperature signal that the temperature threshold violation has cleared; and
the DVFS module is further configured to:
increase the performance level of the one or more processing components from the next highest performance level to the maximum performance level.

21. A computer system for adaptive thermal management in a portable computing device, the system comprising:
means for defining a discrete number of performance levels for one or more processing components in the PCD, wherein each of the performance levels is associated with a voltage and clock frequency supplied to the one or more processing components;
means for monitoring a plurality of temperature sensors in the PCD, wherein each temperature sensor is associated with one or more of temperature sensitive components;
means for receiving an interrupt signal from one of the plurality of temperature sensors;
means for sampling temperature signals from one or more of the plurality of temperature sensors;
means for determining that a particular temperature signal indicates that a temperature threshold associated with one of the temperature sensitive components has been violated;
means for reducing the performance level of one or more of the processing components from a maximum performance level to a next highest performance level within the defined discrete number of performance levels responsive to the indication that the temperature threshold has been violated;
means for continuing to sample the particular temperature signal;
means for determining from the particular temperature signal that the temperature threshold violation has cleared;
means for increasing the performance level of the one or more processing components from the next highest performance level to the maximum performance level at the conclusion of a first penalty period having a predetermined duration; and
means for monitoring the plurality of temperature sensors for a reset period, wherein:
if, during the reset period, the particular temperature signal indicates that the temperature threshold has been re-violated, the duration of a subsequent penalty period is increased relative to the duration of the first penalty period; and
if, during the reset period, the particular temperature signal indicates that the temperature threshold has not been re-violated, the duration of a subsequent penalty period is reset to a default duration.

22. The computer system of claim 21, wherein each of the temperature sensitive components is selected from a group comprised of a junction component, a package on package ("PoP") memory component and an outer shell component.

23. The computer system of claim 21, further comprising:
means for defining a plurality of temperature thresholds associated with the one or more temperature sensitive components in the PCD.

24. The computer system of claim 23, wherein at least one of the plurality temperature thresholds is associated with a package on package ("PoP") memory component.

25. The computer system of claim 23, wherein at least one of the plurality of temperature thresholds is associated with an outer shell component.

26. A computer program product comprising a non-transitory computer usable medium having a computer readable program code embodied therein, said computer readable program code adapted to be executed to implement a method for adaptive thermal management in a portable computing device, said method comprising:
defining a discrete number of performance levels for one or more processing components in the PCD, wherein each of the performance levels is associated with a voltage and clock frequency supplied to the one or more processing components;
monitoring a plurality of temperature sensors in the PCD, wherein each temperature sensor is associated with one or more of temperature sensitive components;
receiving an interrupt signal from one of the plurality of temperature sensors;
sampling temperature signals from one or more of the plurality of temperature sensors;

determining that a particular temperature signal indicates that a temperature threshold associated with one of the temperature sensitive components has been violated;

reducing the performance level of one or more of the processing components from a maximum performance level to a next highest performance level within the defined discrete number of performance levels responsive to the indication that the temperature threshold has been violated;

continuing to sample the particular temperature signal;

determining from the particular temperature signal that the temperature threshold violation has cleared;

increasing the performance level of the one or more processing components from the next highest performance level to the maximum performance level at the conclusion of a first penalty period having a predetermined duration; and monitoring the plurality of temperature sensors for a reset period, wherein:

if, during the reset period, the particular temperature signal indicates that the temperature threshold has been re-violated, the duration of a subsequent penalty period is increased relative to the duration of the first penalty period;

and if, during the reset period, the particular temperature signal indicates that the temperature threshold has not been re-violated, the duration of a subsequent penalty period is reset to a default duration.

27. The computer program product of claim 26, wherein each of the temperature sensitive components is selected from a group comprised of a junction component, a package on package ("PoP") memory component and an outer shell component.

28. The computer program product of claim 26, further comprising:

defining a plurality of temperature thresholds associated with the one or more temperature sensitive components in the PCD.

29. The computer program product of claim 28, wherein at least one of the plurality temperature thresholds is associated with a package on package ("PoP") memory component.

30. The computer program product of claim 28, wherein at least one of the plurality of temperature thresholds is associated with an outer shell component.

* * * * *